United States Patent
Queally et al.

[11] Patent Number: 5,597,351
[45] Date of Patent: Jan. 28, 1997

[54] CARCASS DEBONING

[75] Inventors: Peter Queally; Oliver Lennon, both of Waterford, Ireland

[73] Assignee: Eez-Away Limited, Newtown, Ireland

[21] Appl. No.: 433,400

[22] PCT Filed: Nov. 17, 1993

[86] PCT No.: PCT/IE93/00055

§ 371 Date: Jun. 15, 1995

§ 102(e) Date: Jun. 15, 1995

[87] PCT Pub. No.: WO94/10847

PCT Pub. Date: May 26, 1994

[30] Foreign Application Priority Data

Nov. 17, 1992 [IE] Ireland ................ 2825/92

[51] Int. Cl.[6] ............................ A22C 17/04
[52] U.S. Cl. ................ 452/135; 452/128; 452/136
[58] Field of Search .................. 452/135, 136, 452/138, 128

[56] References Cited

U.S. PATENT DOCUMENTS 3,811,152  5/1974  Herubel ................ 452/136
4,389,749  6/1983  Korhonen ................ 17/46
5,108,344  4/1992  Debey ................ 452/136

FOREIGN PATENT DOCUMENTS

| 0198329 | 4/1985 | European Pat. Off. |
| 0235001 | 1/1987 | European Pat. Off. |
| 0443101 | 11/1990 | European Pat. Off. |
| 2093160 | 6/1970 | France |
| 2598887 | 5/1986 | France |
| 88/08250 | 11/1988 | WIPO |

*Primary Examiner*—Willis Little
*Attorney, Agent, or Firm*—Jacobson, Price, Holman & Stern, PLLC

[57] ABSTRACT

Apparatus for deboning carcasses comprises an overhead rail (1) carrying carcass transport hooks (12) and a drop arm (30) which is pivotally mounted to a bracket (31). A support hook (35) is connected by a link chain (36) to the drop arm (30) and a pneumatic ram (33) pushes the arm (30) downwardly. A transport hook engaging finger (40) is operated by a double acting pneumatic ram (45) to move a transport hook (12). The support hook (35) is attached to part of the carcass suspended on the transport hook (12) and the drop arm (30) is forced down by the ram (33) to apply a separating force as a skeletal part is removed from the carcass.

33 Claims, 6 Drawing Sheets

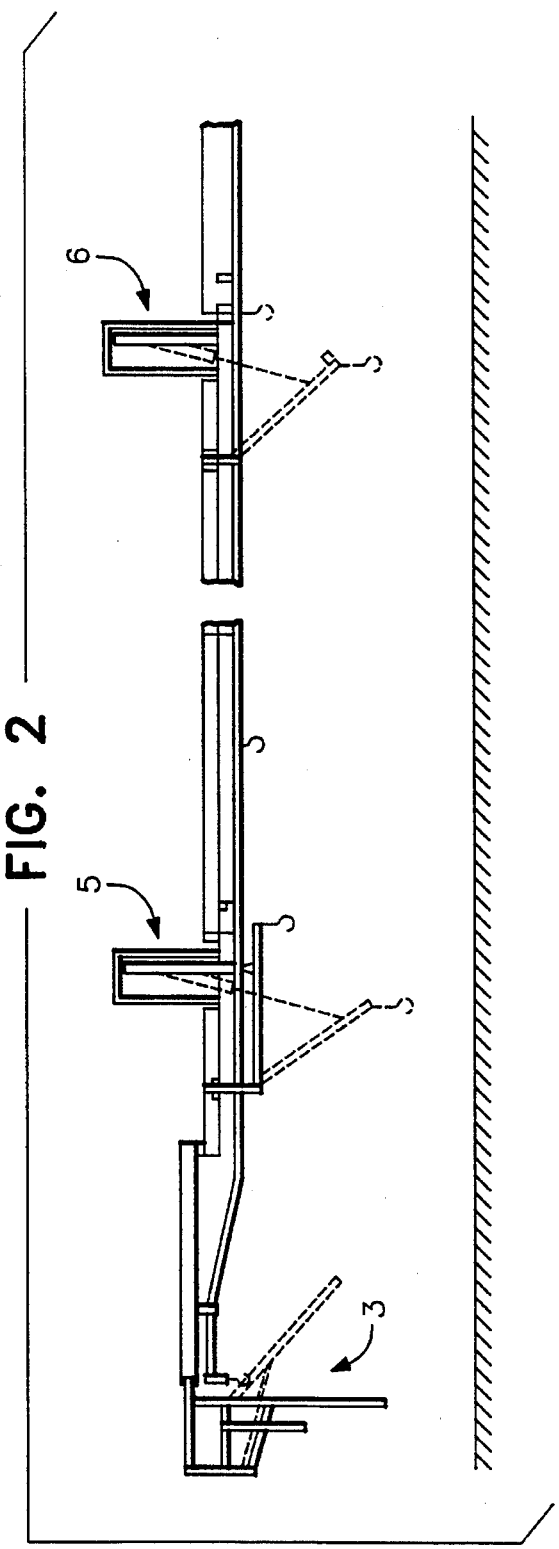
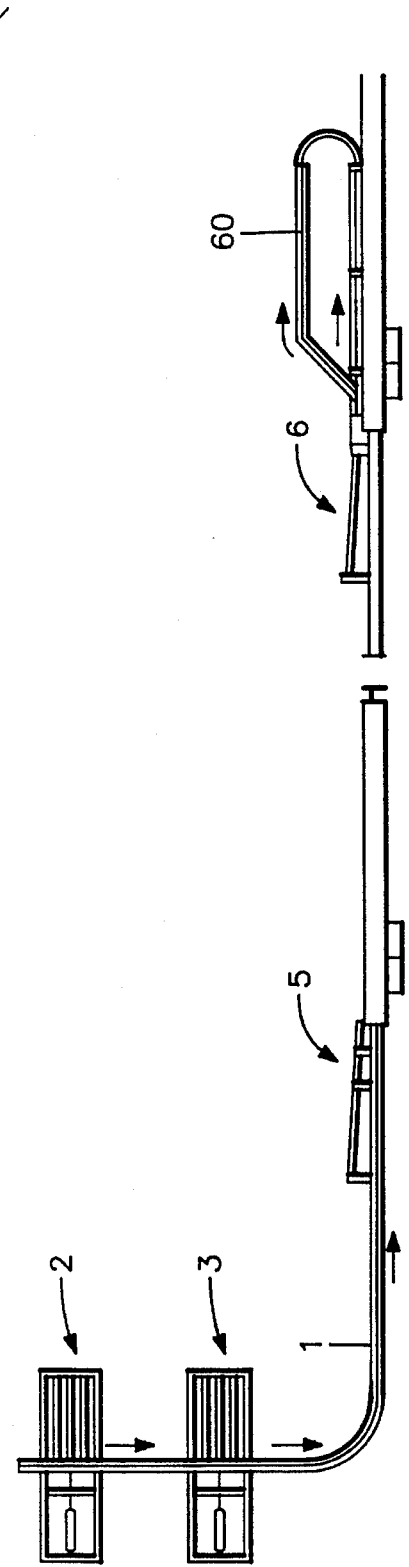

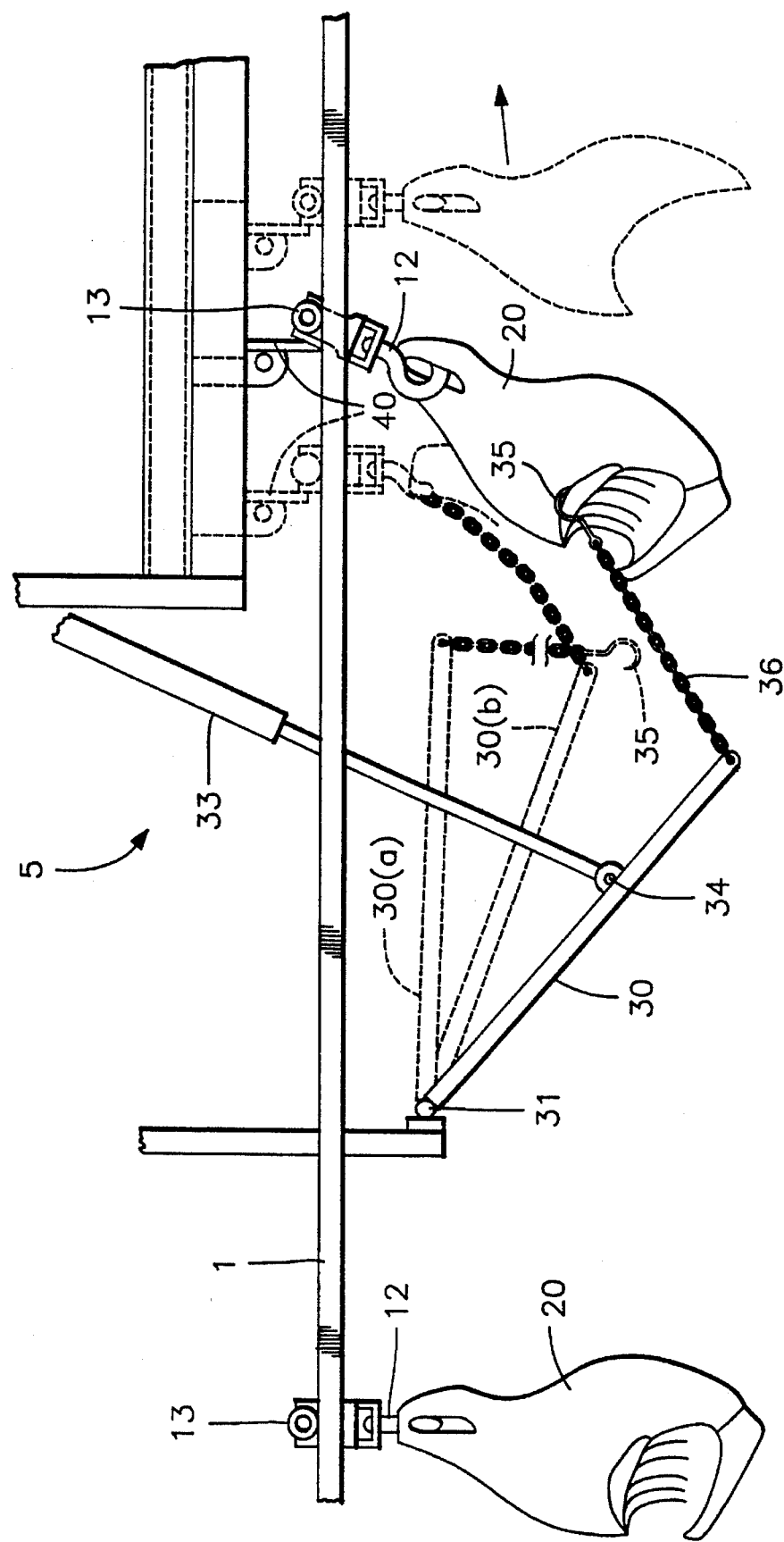

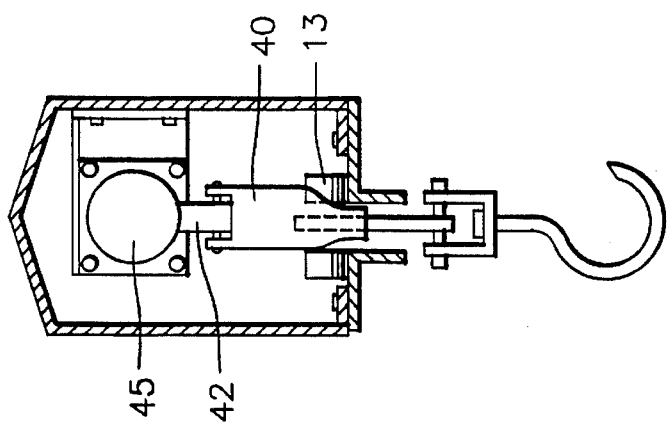
FIG. 7
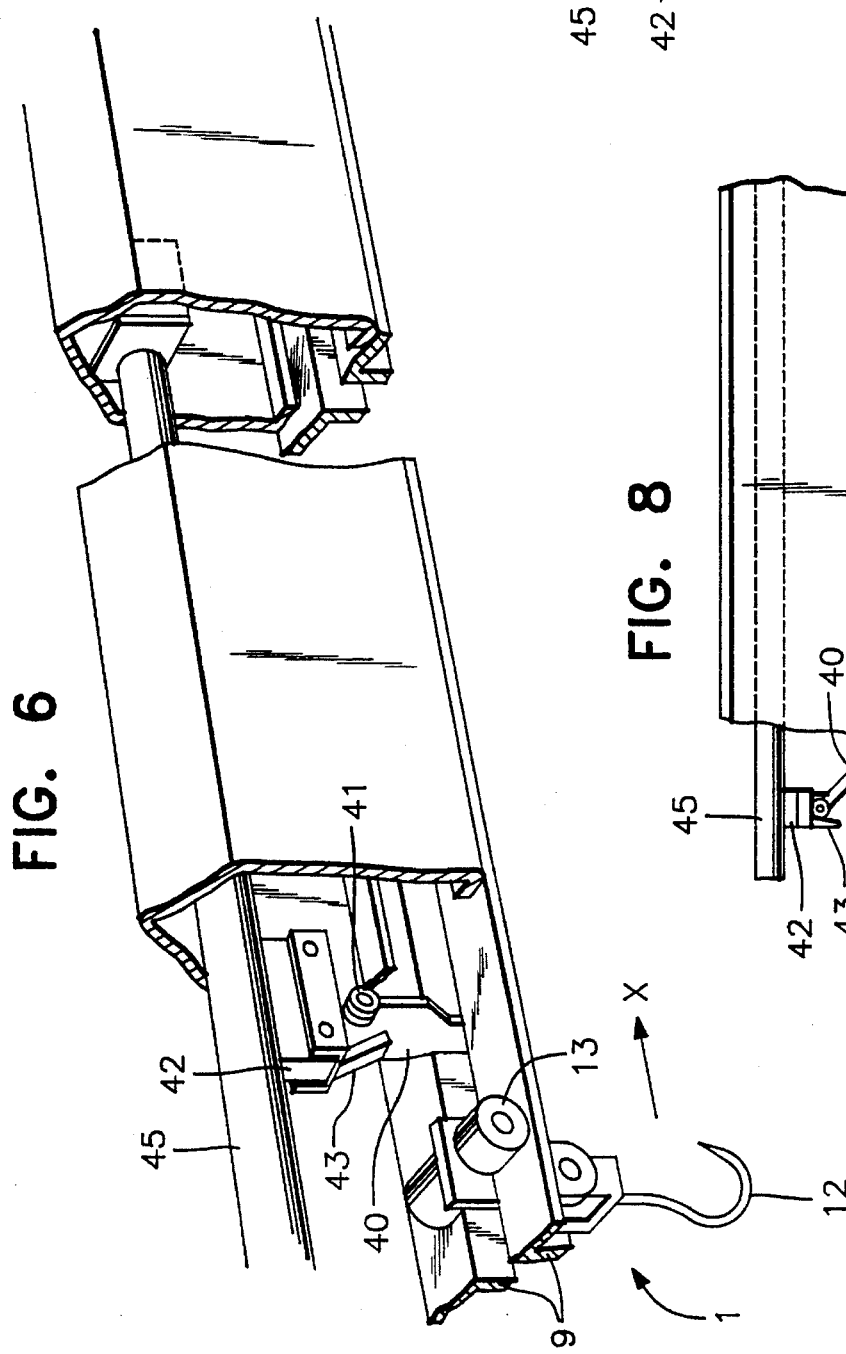
FIG. 6
FIG. 8

CARCASS DEBONING

The invention relates to a method and apparatus for the deboning of carcasses and the dressing of meat generally.

U.S. Pat. No. 4,389,749 describes a process for the coarse cutting up of a meat carcass which includes the step of attaching a gripping means to the meat to widen incisions and to make it easier for a knife to be inserted to cut loose meat from a skeleton.

FR-A-2,093,160 describes a spreading device for skinning or cutting up meat carcasses. The back legs of the carcass are attached to hooks which are splayed apart by a ram.

EP-A-0,198,329 describes a process for cutting up the fore-quarters of cattle by suspending the quarter on a vertical hook, using a second hook to incline the quarter so that its two ends are extended by gravity, releasing the first hook allowing the quarter to become horizontal, and extending the quarter in the horizontal position.

WO-A-88/08250 describes a process for separating skeleton bones from a carcass by hanging the carcass on a first hook, and attaching a second meat hook to a part of the carcass to be removed. An arm is provided to press the carcass forwardly to assist in separating the skeletal parts from the meat. The driving force and the speed of the arm are regulated independently of each other. The second meat hook is held static at the overhead conveyor by a support when the skeleton part is separated from the carcass.

FR-A-2,598,887 describes an arrangement for handling carcasses including a rail mounted hook and a stop against which the carcasses is engaged. A drop arm pushes the carcass against the stop. The skeleton is stripped off by attaching a gripping means to the skeleton and pushing or pulling the skeleton from the meat.

While all of the devices described in these prior specifications are improvements over a purely manual system for deboning carcasses, there is still a need for an improved apparatus for and method of deboning carcasses. In particular, there is a need to provide a deboning apparatus and method which is easily operated and facilitates separation of skeleton parts from a carcass.

According to one aspect, the invention provides an apparatus for deboning carcasses comprising:
a transport rail for support of hooks on which carcasses are hung;
engagement means for engaging part of a carcass; and
means for pushing the engagement means downwardly and for supporting the engagement means in a lowered position relative to the transport rail to apply a separating force as a skeletal part is being separated from a carcass.

In a particularly preferred embodiment of the invention, the engagement means comprises a drop arm. In a preferred embodiment of the invention, the drop arm is pivotally mounted adjacent to the transport rail.

In a preferred embodiment of the invention the drop arm has a support hook for engagement with part of the carcass.

Preferably the hook is attached to the drop arm by a link means.

Most preferably, the link means comprises a chain.

In one embodiment of the invention, the means for pushing the drop arm downwardly comprises a drop arm ram means.

In a preferred arrangement, the drop arm is movable upwardly as a skeletal part is separated from a carcass.

In one embodiment of the invention, the apparatus includes transport hook engaging means for pushing a transport hook along the rail as a skeletal part is being separated from a carcass.

Preferably, the transport hook engaging means comprises a hook engaging finger mounted to a transport hook ram means for movement of the finger and hence the transport hook.

In a particularly preferred embodiment of the invention, the transport hook ram means is a double action ram.

In one embodiment of the invention, the hook engaging finger is mounted to engage a transport hook in only one direction of travel. Typically, the finger is hingedly mounted.

In another embodiment of the invention, at least portion of the drop arm is provided by a drop rail which is engageable in a raised position with the transporting rail for directing portion of a carcass carried by a drop arm hook to a transporting rail.

In one embodiment of the invention, the apparatus includes an additional transport rail for leading the carcass to further cutting or trimming stations.

Preferably, the drop arm is engageable with the additional transport rail. In a preferred arrangement the drop arm includes guide means for engaging with corresponding guide means of the additional transport rail to direct a carcass along the transport rail to further cutting or trimming stations.

In another aspect the invention provides apparatus for preparing a carcass for deboning comprising a cradle for receiving a carcass, the cradle being pivotally mounted and means for moving the cradle to a desired working position. Preferably the means for moving the cradle comprises a ram means.

The invention further provides a carcass dressing system comprising at least one carcass deboning apparatus according to the invention and at least one carcass preparation apparatus according to the invention.

In another aspect the invention provides a method of deboning carcasses comprising the steps of:
transporting a carcass suspended by a hook on a transporting rail to a deboning station;
attaching an additional hook to portion of the carcass at the deboning station;
forcing one of the hooks downwardly below the other hook relative to the transporting rail, and
moving the hooks apart relative to each other.

In a preferred embodiment of this aspect of the invention the method includes the step of:
preparing a carcass for deboning by placing the carcass on a cradle,
moving the cradle so that the carcass is supported in a desired working position, and
working on the carcass supported on the cradle.

Preferably, a carcass is transported to a first deboning station where part of the skeletal parts of the carcass are removed and the carcass with some of the skeletal parts removed is transported to a second deboning station where further skeletal parts are removed.

In one embodiment of the invention, after deboning, the carcass is directed to one of a number of cutting or trimming stations.

The invention will be more clearly understood from the following description thereof, given by way of example only with reference to the accompanying drawings in which:

FIG. 1 is an overhead schematic plan view of portion of a carcass dressing system incorporating the apparatus and method of the invention;

FIG. 2 is a side view of portion of the carcass dressing system of FIG. 1;

FIG. 3 is a side view of an apparatus for deboning carcasses according to the invention;

FIG. 6 is a perspective view of a transport hook engaging means of the apparatus;

FIG. 7 is an end view of the apparatus of FIG. 6;

FIG. 8 is a side view of the apparatus of FIG. 6;

Figure 4:
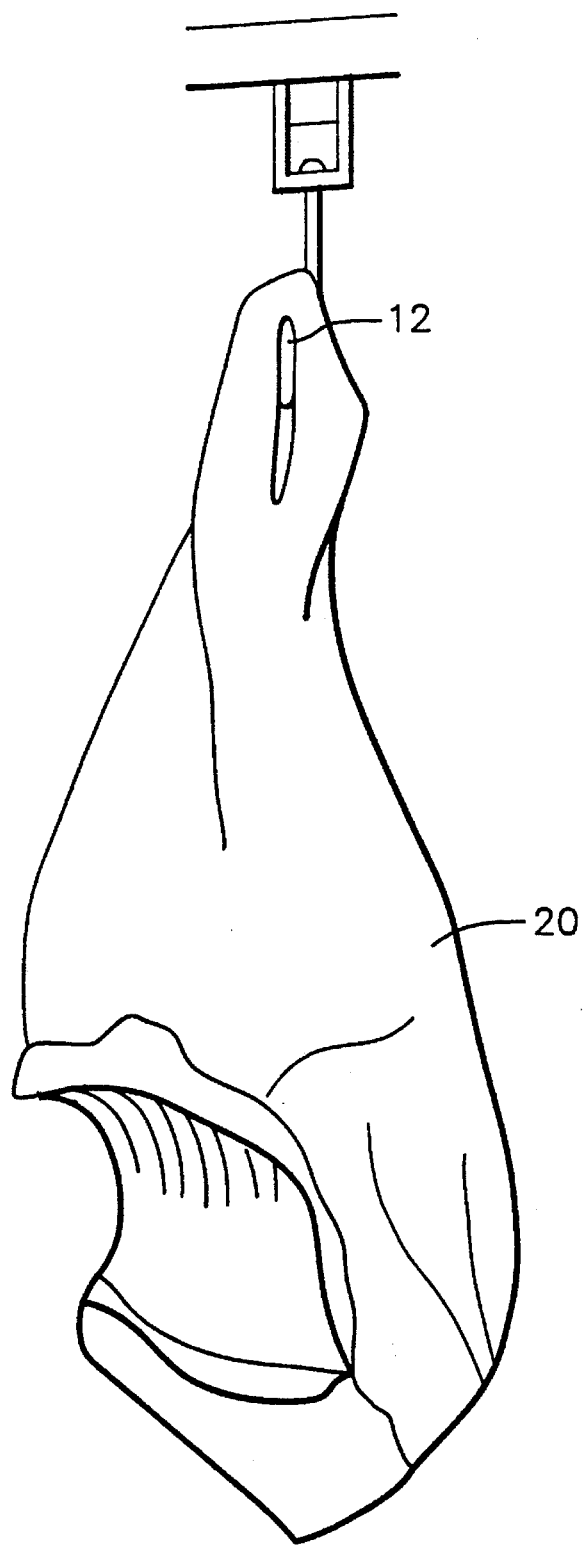
FIG. 4 is a perspective view of portion of a carcass.

Referring to the drawings and initially to FIGS. 1 and 2 thereof, there is illustrated a carcass dressing rail system according to the invention including a transport rail 1 along which carcasses to be dressed are led. The dressing rail system comprises a first carcass dressing station 2, a second carcass dressing station 3, a first carcass deboning station 5, and a second carcass deboning station 6. The direction of travel of the carcasses along the rail system 1 is illustrated by the arrows in FIG. 1.

Referring to FIGS. 6 to 8, the overhead rail 1 is shown in more detail and in this case comprises a pair of spaced-apart rail sections 9, 10 supported on an overhead support (not shown). A carcass transport hook 12 incorporating rollers 13 is suspended on the rail sections 9, 10. The hook 12 in turn supports a carcass such as a hindquarter 20. A rib part of the hindquarter 20 may be cut off at the preparation stations 2, 3. The operation of the apparatus of the invention will be described below with reference to the separation of skeletal parts from a hindquarter, however, it will be appreciated that the apparatus and method of the invention may be applied to any meat part including a forequarter.

Referring particularly to FIG. 3, there is illustrated a carcass deboning apparatus according to the invention including engagement means in this case provided by a drop arm 30 which in this case is mounted adjacent to but to one side of the transport rail 1. The drop arm 30 is pivotally mounted at 31 to a fixed bracket 32. Means for pushing the drop arm 30 downwardly and for supporting the drop arm 30 in a lowered position relative to the transport rail 1 is in this case provided by a pneumatic ram 33. The ram 33 is pivotally mounted to the drop arm 30 at a point 34 which is spaced upwardly from the end of the drop arm 30 and is mounted at it's upper end to a support bracket (not shown). The drop arm 30 may be angled inwardly towards the transport rail 1 to optimise the cutting operation. A support hook 35 is attached to the free end of the drop arm 30 by a link means, in this case formed by a chain 36.

Transport hook engaging means for engaging the rollers 13 of a transport hook 12 is in this case provided by a hook engaging finger 40 which is hingedly mounted at 41 to a support 42 and a stop 43 is provided so that the finger 40 engages the rollers 13 of the transport hook 12 in only one direction of travel X (see FIG. 6), in this case the forward direction of travel of the transport hook 12. The support 42 for the transport hook engaging finger 40 and the stop 43 is carried by a transport hook ram means which in this case is provided by a double acting rodless ram 45. The ram is typically of the type sold under the Trademark ORIGA or the Trademark UNIVER.

Figure 5:
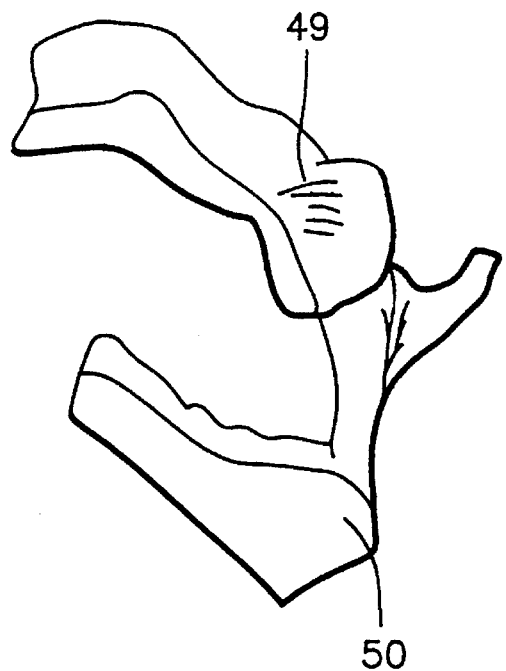
FIG. 5 is a perspective view of a skeletal part of the carcass.

In use, a transport hook 12 with a carcass 20 supported thereon is moved along the transport rail 1 until it passes beyond the drop arm 30 to the position illustrated in full line to the right in FIG. 3. In this position, the ram 33 is not extended and the drop arm 30 is in a position illustrated by interrupted lines 30(a) extending substantially parallel to the transport rail 1. When the carcass 20 is in position, the support hook 35 carried by the chain 36 of the drop arm 30 is engaged with part of the carcass, in this case a skeletal part which in this case is a recess 49 of an aitch or hip bone 50 in the carcass 20. An aitch bone 50 removed from the carcass is illustrated in FIG. 5. In this position, the hook 35 loosely engages the skeletal part and no force is applied. The rollers 13 of the transport hook 12 are engaged by the transport hook engaging finger 40 carried by the ram 45. An operative then activates the ram 33 to push the drop arm 30 downwardly so that a separating force is applied to the skeletal part 50 of the carcass 20 through the hook 35. The ram 45 is actuated to pull the transport hook engaging finger 40 forwardly along the transport rail 1 moving the support hook 35 carried by the drop rail 30 and the transport hook 12 apart relative to one another.

The drop rail ram 33 applies a downward pushing force at the point of attachment of the hook 35 to the skeletal part 50 while the ram 45 applies a pulling force to the carcass 20. In this way, a separating force is applied, the drop arm 30 pulling the skeletal part 50 away from the carcass 20 as an operative cuts away the skeletal part from the carcass. The drop arm 30 moves upwardly to the position illustrated by interrupted lines 30(b) in FIG. 3 as the operative continues the cutting away of the skeletal part from the carcass.

When the skeletal part 50 has been removed, it is unhooked from the support hook 35 carried by the drop arm 30 and the carcass 20 with the skeletal part 50 removed travels on to the next deboning station described below. Thus, a continuous separating pressure is applied to assist an operative to cleanly remove the bones from the carcass while avoiding damage to the meat. The operation which may be readily supervised is carried out in a comfortable standing position without a requirement for elevated platforms. Not only is the operation considerably faster than conventional deboning operations but also it is generally more efficient in that bones are cleanly removed without damaging the meat.

Figure 9:
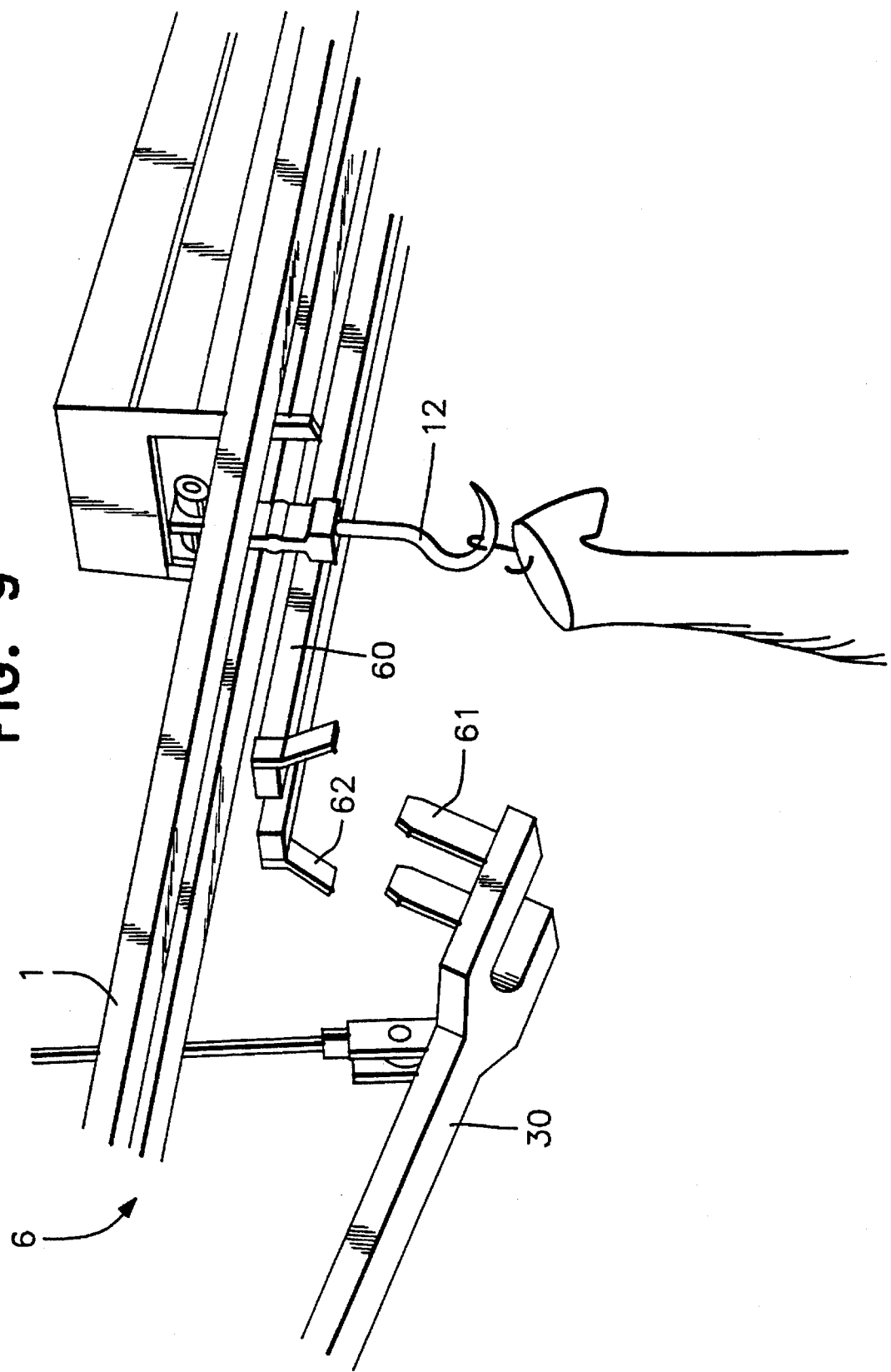
FIG. 9 is a perspective view of another apparatus for deboning carcasses according to the invention.

Referring particularly to FIG. 9, there is illustrated a second deboning station 6 incorporating a deboning apparatus also according to the invention. In the case of a hindquarter, the drop arm hook is attached to the Achilles tendon and the shin bone is removed at the second deboning station 6. The apparatus is similar to the apparatus described above with reference particularly to FIGS. 3 to 7 and like parts are assigned the same reference numerals. In this case, a further transport rail 60 is provided and the drop arm 30 includes guide means 61 for engaging with corresponding guide means 62 of the transport rail 60 allowing the transport hook to travel on the rail 60 to direct a carcass to cutting or trimming stations for further processing, if desired.

Figures 10, 11:
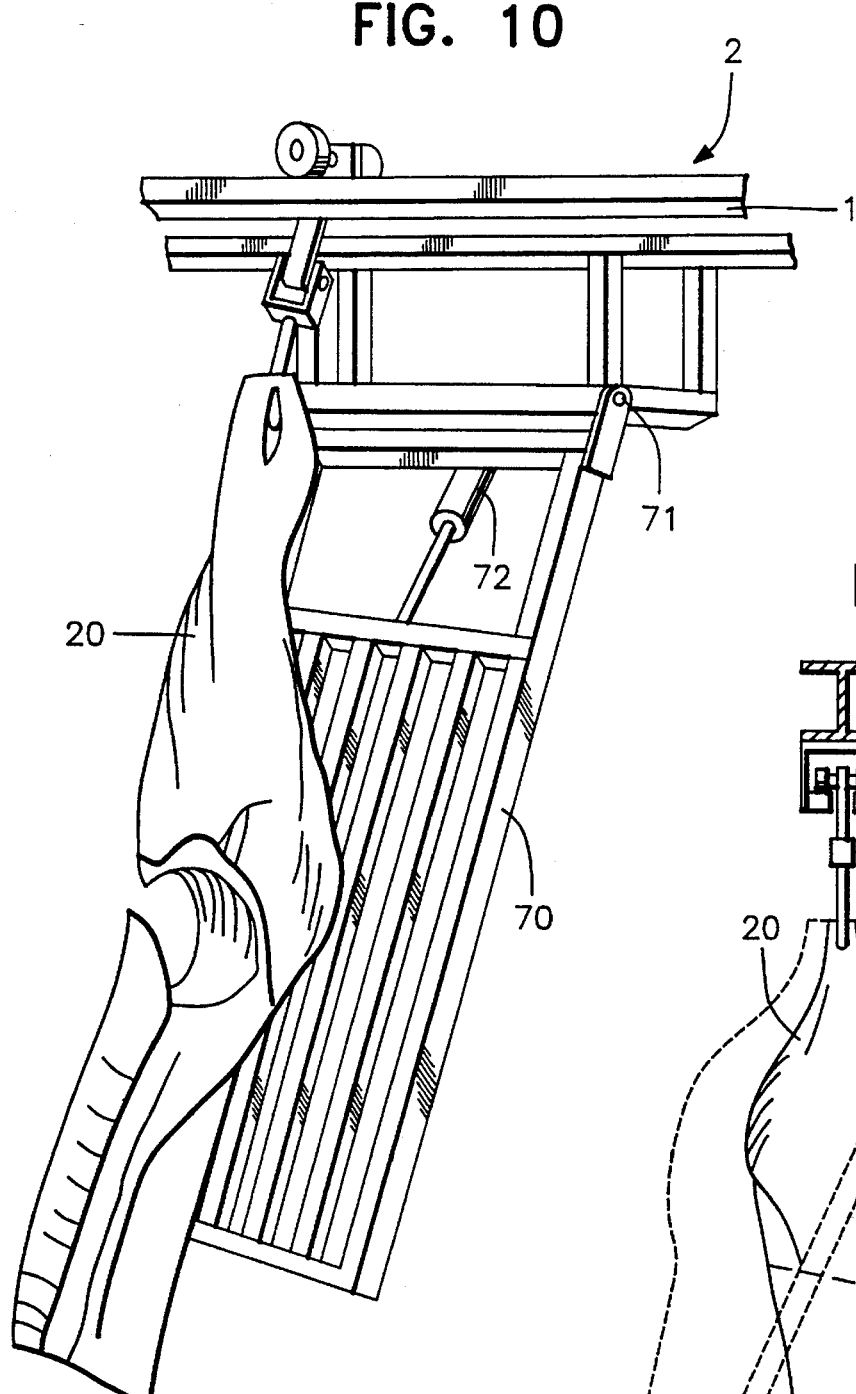
FIG. 10 is a perspective view of a carcass preparation station used in the method of the invention.
FIG. 11 is an end view of the preparation station of FIG. 10.

Referring to FIGS. 10 and 11, a typical preparation station 2, 3 is illustrated in more detail. The station 2 includes a support cradle or brace 70 of open framework construction pivotally suspended at 71 and movable in the direction of the arrow Y as illustrated in FIG. 11 by a pneumatic ram 72. As illustrated, the cradle 70 may be used to support a carcass 20 in a desired working position allowing an operative to readily work on the carcass as required. The cradle 70 allows the carcass to be presented to the operative in the optimum position for working. At the preparation station the carcass may be scribed to indicate the position of cuts to be made later and/or part of the carcass may be removed.

It will be appreciated that the deboning apparatus of the present invention may be utilised with any type of transport rail including a round bar rail or a flat bar rail. In each case, the transport hook engaging means may be of different configuration to that described above, however, the principle of operation will be the same.

It will also be appreciated that the drop arm may be a rail and/or may be formed by part of the main transport rail and/or of another transport rail.

Many variations on the specific embodiments of the invention described will be readily apparent and accordingly the invention is not limited to the embodiments hereinbefore described which may be varied in both construction and detail.

We claim:

1. Apparatus for deboning carcasses comprising:

a transport hook for hanging of a carcass;

a transport rail for support of said transport hook;

transport hook engaging means for pushing said transport hook along said transport rail as a skeletal part is being separated from a carcass;

engagement means for engaging part o a carcass; and means for pushing the engagement means downwardly and for supporting the engagement means in a lowered position relative to the transport rail to apply a separating force as a skeletal part is being separated from a carcass.

2. Apparatus as claimed in claim 1 wherein the engagement means comprises a drop arm.

3. Apparatus as claimed in claim 2 wherein the drop arm is pivotally mounted adjacent to the transport rail.

4. Apparatus as claimed in claim 2 wherein the drop arm has a support hook for engagement with part of the carcass.

5. Apparatus as claimed in claim 4 wherein the hook is attached to the drop arm by a link means.

6. Apparatus as claimed in claim 5 wherein the link means comprises a chain.

7. Apparatus as claimed in claim 2 wherein the means for pushing the drop arm downwardly comprises a drop arm ram means.

8. Apparatus as claimed in claim 2 wherein the drop arm is movable upwardly as a skeletal part is separated from a carcass.

9. Apparatus as claimed in claim 1 wherein the transport hook engaging means comprises a hook engaging finger mounted to a transport hook ram means for movement of the finger and hence the transport hook.

10. Apparatus as claimed in claim 9 wherein the transport hook ram means is a double acting ram.

11. Apparatus as claimed in claim 9 wherein the hook engaging finger is mounted to engage a transport hook in only one direction of travel.

12. Apparatus as claimed in claim 11 wherein the finger is hingedly mounted.

13. Apparatus as claimed in claim 2 wherein at least portion of the drop arm is provided by a drop rail which is engageable in a raised position with the transporting rail for directing portion of a carcass carried by a drop arm hook to a transporting rail.

14. Apparatus as claimed in claim 2 including an additional transport rail for leading the carcass to further cutting or trimming stations.

15. Apparatus as claimed in claim 14 wherein the drop arm is engageable with the additional transport rail.

16. Apparatus as claimed in claim 15 wherein the drop arm includes guide means for engaging with corresponding guide means of the additional transport rail to direct a carcass along the transport rail to further cutting or trimming stations.

17. Apparatus for deboning carcasses comprising:

a transport hook for hanging of a carcass;

a transport rail for support of said transport hook;

a drop arm for engaging part of a carcass;

means for pushing the drop arm downwardly and for supporting the drop arm in a lowered position relative to the transport rail to apply a separating force as a skeletal part is being separated from a carcass; and at least a portion of said drop arm being provided by a drop rail engageable in a raised position with said transport rail for directing a portion of a carcass carried by a drop arm hook to a further transport rail.

18. Apparatus for deboning carcasses comprising:

a transport hook for hanging of a carcass;

a transport rail for support of said transport hook;

a drop arm for engaging part of a carcass;

means for pushing the drop arm downwardly and for supporting the drop arm in a lowered position relative to the transport rail to apply a separating force as a skeletal part is being separated from a carcass; and an additional transport rail for leading the carcass to further cutting or trimming stations, said drop arm being engageable with said additional transport rail.

19. Apparatus for deboning carcasses comprising:

a transport rail;

a transport hook on which a carcass is hung, the transport hook being supported on the transport rail;

transport hook engaging means for moving the transport hook along the transport rail;

a drop arm having a support for engagement with part of a carcass; and means for pushing the drop arm downwardly and for supporting the drop arm in a lowered position relative to the transport rail;

the means for pushing the drop arm downwardly and the transport hook engagement means being operated to move the support carried by the drop arm and the transport hook apart to apply a separating force to the skeletal part as the skeletal part is being separated from a carcass.

20. Apparatus as claimed in claim 19 wherein the drop arm is pivotally mounted adjacent to the transport rail.

21. Apparatus as claimed in claim 19 wherein the drop arm support is a support hook for engagement with part of the carcass.

22. Apparatus as claimed in claim 21 wherein the hook is attached to the drop arm by a link means.

23. Apparatus as claimed in claim 22 wherein the link means comprises a chain.

24. Apparatus as claimed in claim 19 wherein the means for pushing the drop arm downwardly comprises a drop arm ram means.

25. Apparatus as claimed in claim 19 wherein the drop arm is movable upwardly as a skeletal part is separated from a carcass.

26. Apparatus as claimed in claim 19 wherein the transport hook engaging means comprises a hook engaging finger mounted to a transport hook ram means for movement of the finger and hence the transport hook.

27. Apparatus as claimed in claim 26 wherein the transport hook ram means is a double acting ram.

28. Apparatus as claimed in claim 26 wherein the hook engaging finger is mounted to engage a transport hook in only one direction of travel.

29. Apparatus as claimed in claim 28 wherein the finger is hingedly mounted.

30. Apparatus as claimed in claim 19 wherein at least a portion of the drop arm is provided by a drop rail which is engageable in a raised position with the transporting rail for directing a portion of a carcass carried by a drop arm hook to a transporting rail.

31. Apparatus as claimed in claim 19 including an additional transport rail for leading the carcass to further cutting or trimming stations.

32. Apparatus as claimed in claim 31 wherein the drop arm is engageable with the additional transport rail.

33. Apparatus as claimed in claim 32 wherein the drop arm includes guide means for engaging with corresponding guide means of the additional transport rail to direct a carcass along the transport rail to further cutting or trimming stations.

* * * * *